United States Patent [19]
Goh

[11] Patent Number: 5,689,438
[45] Date of Patent: Nov. 18, 1997

[54] AUDIO BIT STREAM GENERATOR FOR HIGH DEFINITION TELEVISION UTILIZING PERSONAL COMPUTER, AND CONTROL METHOD THEREFOR

[75] Inventor: Yong Cheul Goh, Kyoungki-do, Rep. of Korea

[73] Assignee: Hyundai Electronics Industries Co., Ltd., Kyoungki-Do, Rep. of Korea

[21] Appl. No.: 396,464

[22] Filed: Mar. 2, 1995

[30] Foreign Application Priority Data

Mar. 7, 1994 [KR] Rep. of Korea .................. 94-4376

[51] Int. Cl.$^6$ ..................... H04N 7/015; H04N 11/24
[52] U.S. Cl. ............. 364/514 R; 348/426; 364/514 A; 395/873; 395/877
[58] Field of Search .............. 348/426; 364/514 R, 364/514 A; 395/873, 877

[56] References Cited

U.S. PATENT DOCUMENTS

| 5,200,811 | 4/1993 | Cho | 358/12 |
|---|---|---|---|
| 5,446,894 | 8/1995 | Demar et al. | 395/650 |

Primary Examiner—Edward R. Cosimano
Attorney, Agent, or Firm—Fish & Richardson P.C.

[57] ABSTRACT

An audio bit stream generator for an HDTV utilizing a PC, including: a hard disc for storing an HDTV audio data encoded and prepared through computer stimulations; an input/output bus; a first-in first-out (FIFO) memory; a status register for controlling the input/output bus; a PC with main memory for reading a certain amount of the audio data and for outputting the data to the input/output bus; an address decoder section for analyzing output addresses of the input/output bus, and for controlling the FIFO memory and the status register section. The FIFO memory stores 8-bit data from the input/output bus and for outputs modified 8-bit data to a parallel/serial converter. In addition to the parallel/serial converter, the audio bit stream generator further includes: a memory read/write control section for controlling read/write operations of the FIFO memory; a switch for controlling reading operations of the FIFO memory under a control of said memory read/write control section; and a clock generating section for generating transmission clocks used in conjunction with the parallel/serial converter, which converts 8-bit data to 1-bit data, thereby forming the audio bit stream. In another aspect, the invention is a method for controlling an audio bit stream generator by utilizing a PC.

9 Claims, 10 Drawing Sheets

AUDIO BIT STREAM GENERATOR FOR HIGH DEFINITION TELEVISION UTILIZING PERSONAL COMPUTER, AND CONTROL METHOD THEREFOR

FIELD OF THE INVENTION

The present invention relates to an audio bit stream generator for a high definition television (to be called HDTV) utilizing a personal computer (to be called PC), and a control method therefor, which is applied in developing an audio decode without manufacturing an audio encoder in an audio field of the HDTV (which is the next generation TV), and which is utilized in a multi-media, a satellite broadcasting apparatus, and a data transmitting apparatus using a data compressing algorithm. Particularly, in the present invention, there are formed bit streams which are encoded through computer simulations based on a data compressing algorithm for an HDTV by utilizing a PC. Then, the bit streams are stored into a hard disc, and they are outputted at a certain audio transmitting rate.

BACKGROUND OF THE INVENTION

A prior art is found in U.S. Pat. No. 5,200,811.

The constitution of this invention will be briefly described below.

That is, this invention includes: receiving processor means for converting a radio frequency signal into a first intermediate frequency signal; first filter means for generating a narrow band intermediate frequency signal; second filter means for splitting a second intermediate frequency signal; frequency phase locked loop means for demodulating the second intermediate frequency signal; first low pass filter means and second low pass filter means for low-pass filtering; a first analogue-to-digital converter and a second analogue-to-digital converter for converting the low band frequency signal and the high band frequency signal; separator means for separating the low band frequency signal and the high band frequency signal from the first and second analogue-to-digital converters; audio decoder means for decoding the audio signal; high frequency band signal processor means for interpolating the first digital signal; delay means for delaying the second digital signal; adding means for adding the signals output from the high frequency band processor means; an inversion integration of time compressed luminescence and chrominance means for converting a signal output from the adding means into a luminescence signal and a chrominance signal; and a digital-to-analogue converter for converting the luminescence signal and the chrominance signal into respective analogue signals.

The invention constituted as described above lacks an audio bit stream generating arts for a HDTV Receiver.

SUMMARY OF THE INVENTION

The present invention is intended to overcome the above described disadvantage of the conventional technique.

Therefore, the object of the present invention is to provide an audio bit stream generator for an HDTV utilizing a PC, and a control method therefor, in which a PC interface card is prepared by using a PC to use it in manufacturing and testing an audio decoder for an HDTV.

The audio bit stream generator for an HDTV utilizing a PC according to the present invention includes: a hard disc for storing an HDTV audio data encoded and prepared through computer simulations; a main memory of a PC for reading a certain amount of the audio data to out-put it to an input/output bus; an address decoder section for analyzing an output address of the input/output bus, and for controlling first-in first-out (FIFO) memories and a status register section; the FIFO memories being for storing an output data from the input/output bus of the PC; a memory read/write control section for controlling read/write operations of the FIFO memories; a status register for controlling the input/output bus of the PC; a switch for controlling a reading operation of the FIFO memories under a control of a memory read/write control section; and an interface card section consisting of a clock generating section for outputting transmission clocks and a parallel/serial converter for converting 8-bit data to 1-bit serial data.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
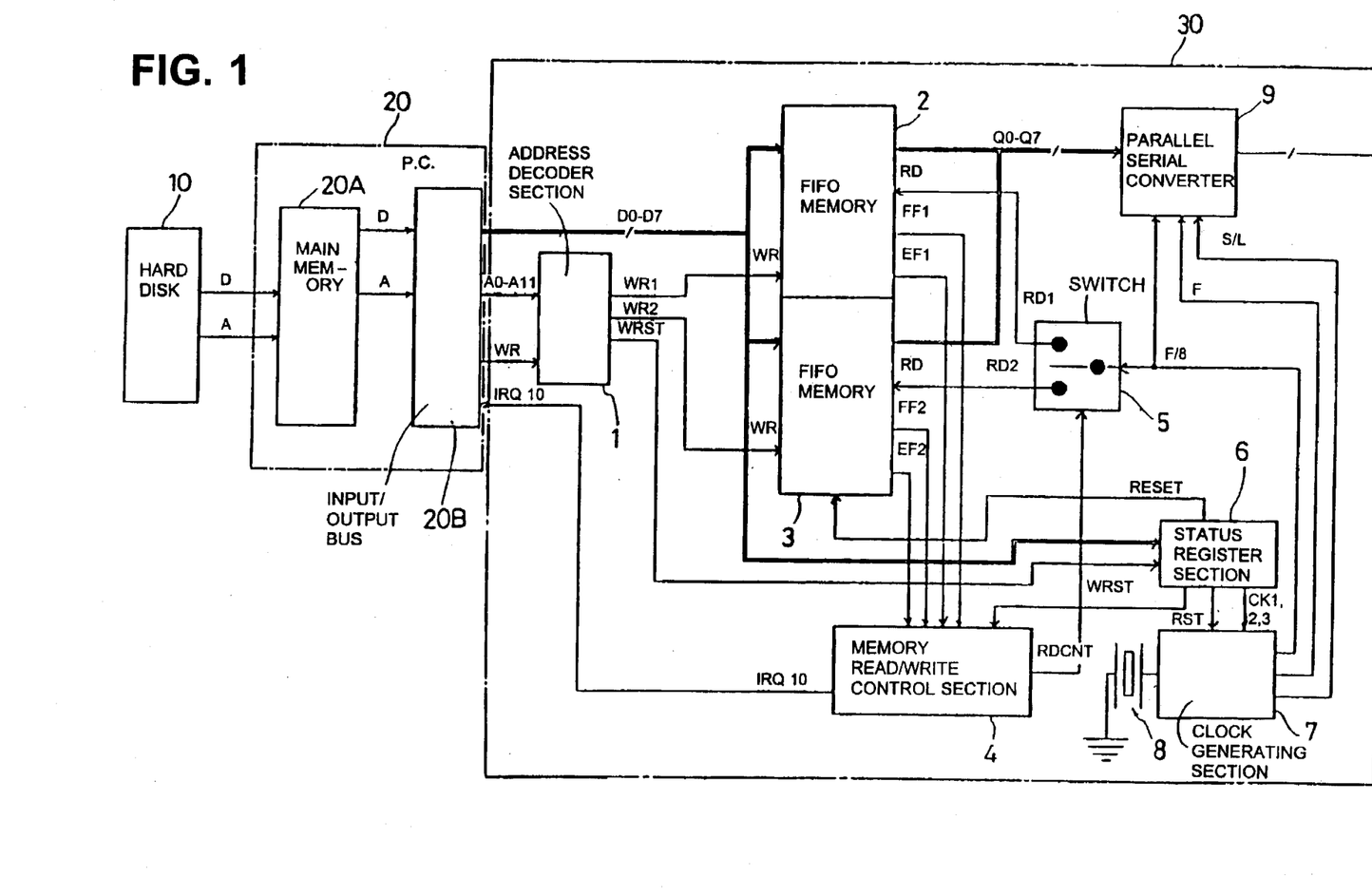
FIG. 1 illustrates the overall constitution of the audio bit stream generator for a PC according to the present invention.

FIG. 1 illustrates the overall constitution of the audio bit stream generator for the PC according to the present invention;

The audio bit stream generator for an HDTV utilizing a PC according to the present invention includes: a hard disc 10 for storing an HDTV audio data encoded and prepared through computer simulations; a main memory 20A of a PC 20 for reading a certain amount of the audio data to output it to an input/output bus 20B; an address decoder section 1 for analyzing output addresses A0–A11 of the input/output bus 20B, and for controlling first-in first-out (FIFO) memories 2 and 3 and a status register section 6; the FIFO memories 2 and 3 being for storing an output data from the input/output bus 20B of the PC 20; a memory read/write control section 4 for controlling read/write operations of the FIFO memories 2 and 3; a status register 6 for controlling the input/output bus 20B of the PC 20; a switch 5 for controlling a reading operation of the FIFO memories 2 and 3 under a control of the memory read/write control section 4; and an interface card section 30 consisting of a clock generating section 7 for outputting transmission clocks, and a parallel/serial converter 9 for converting 8-bit data to 1-bit serial data.

Figure 2:
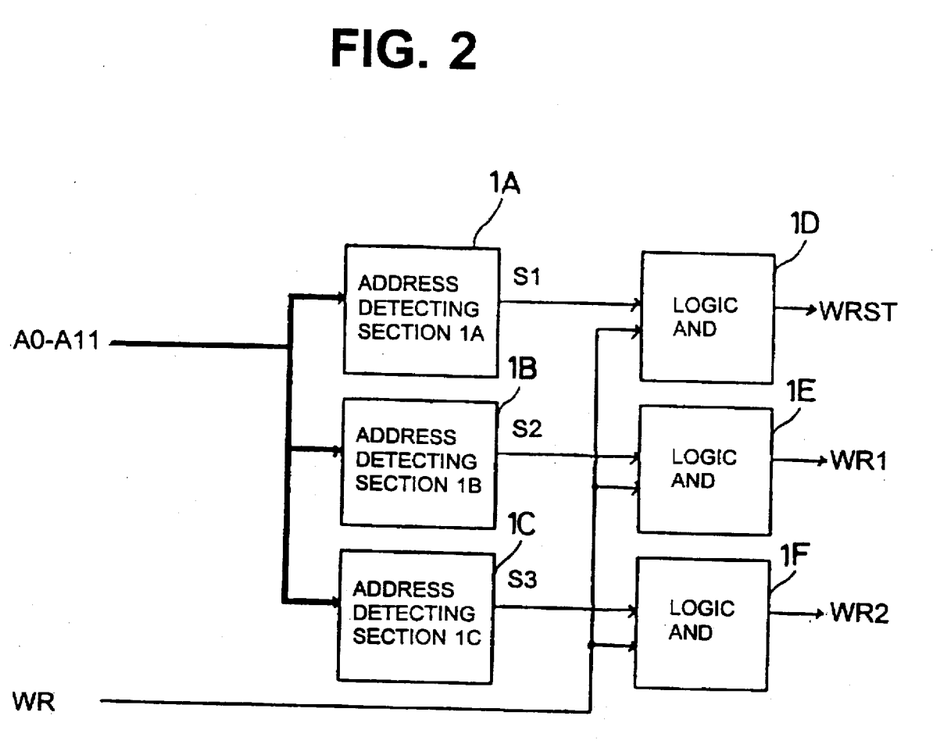
FIG. 2 illustrates the constitution of the address decoder section of FIG. 1.

FIG. 2 illustrates the constitution of the address decoder section 1 of FIG. 1.

The address decoding section 1 includes address detecting sections 1A, 1B and 1C, and logic AND sections 1D, 1E and 1F; inputs the addresses A0–A11 from the input/output bus 20B of the PC 20 into the address detecting sections 1A, 1B and 1C in accordance with the addresses; and subjects output signals S1, S2 and S3 of the address detecting sections 1A, 1B and 1C and writing clocks WR of the input/output bus 20B of the PC 20 to an ANDing to output respective outputs WRST, WR1 and WR2 to the status register section 6 and to the FIFO memories 2 and 3.

Figure 3:
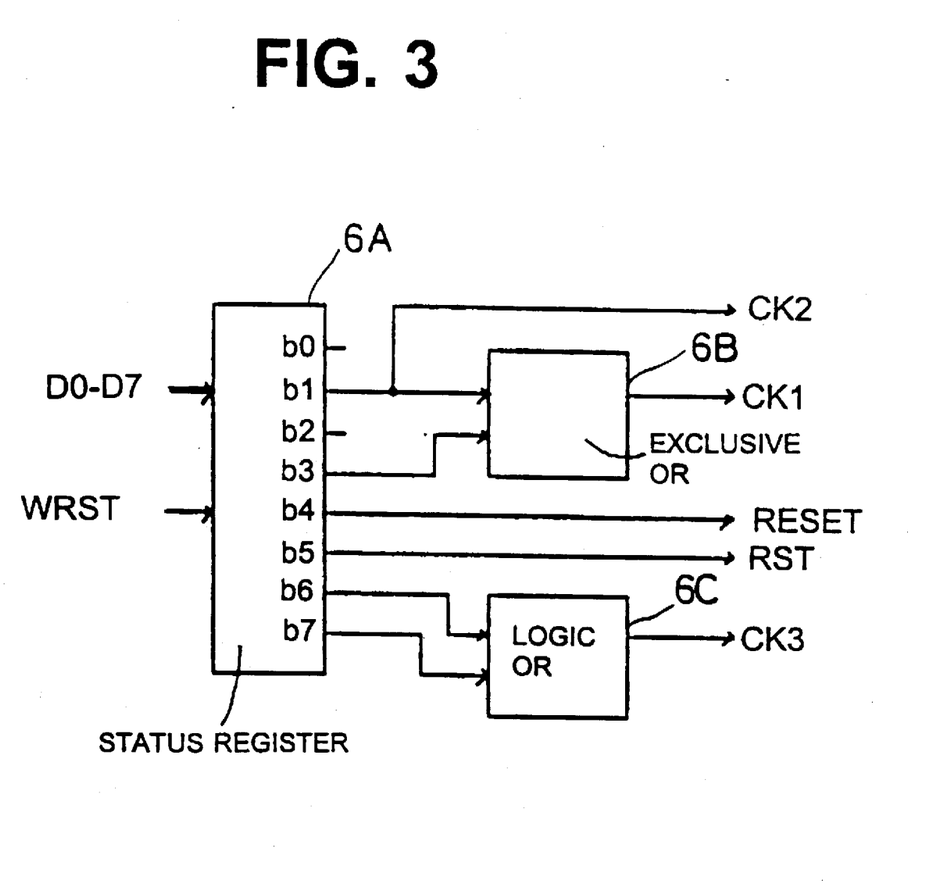
FIG. 3 illustrates the constitution of the status register of FIG. 1.

FIG. 3 illustrates the constitution of the status register 6 of FIG. 1.

The status register section 6 includes a status register 6A, an exclusive OR section 6B and a logic OR section 6C; and in this status register section 6, upper two bits b7 and b6 among 8 data bits b0–b7 of the status register 6A generated by the address decoder section 1 and latched by the clock signal WRST are outputted by the logic OR section 6C as a clock control signal CK3 under an audio system mode; the bit b5 functions as a reset or set signal RST for the clock generating section 7 to control operations of the clock generating section 7; the bit b4 is used as a reset signal for resetting or setting the FIFO memories 2 and 3; the bits b0–b3 show transmission rate of the audio bit stream, and are decoded by the status register section 6 to output clock control signals CK1 and CK2, thereby controlling the frequency-dividing ratio of the clock generating section 7 together with the clock control signal CK3.

Figure 4:
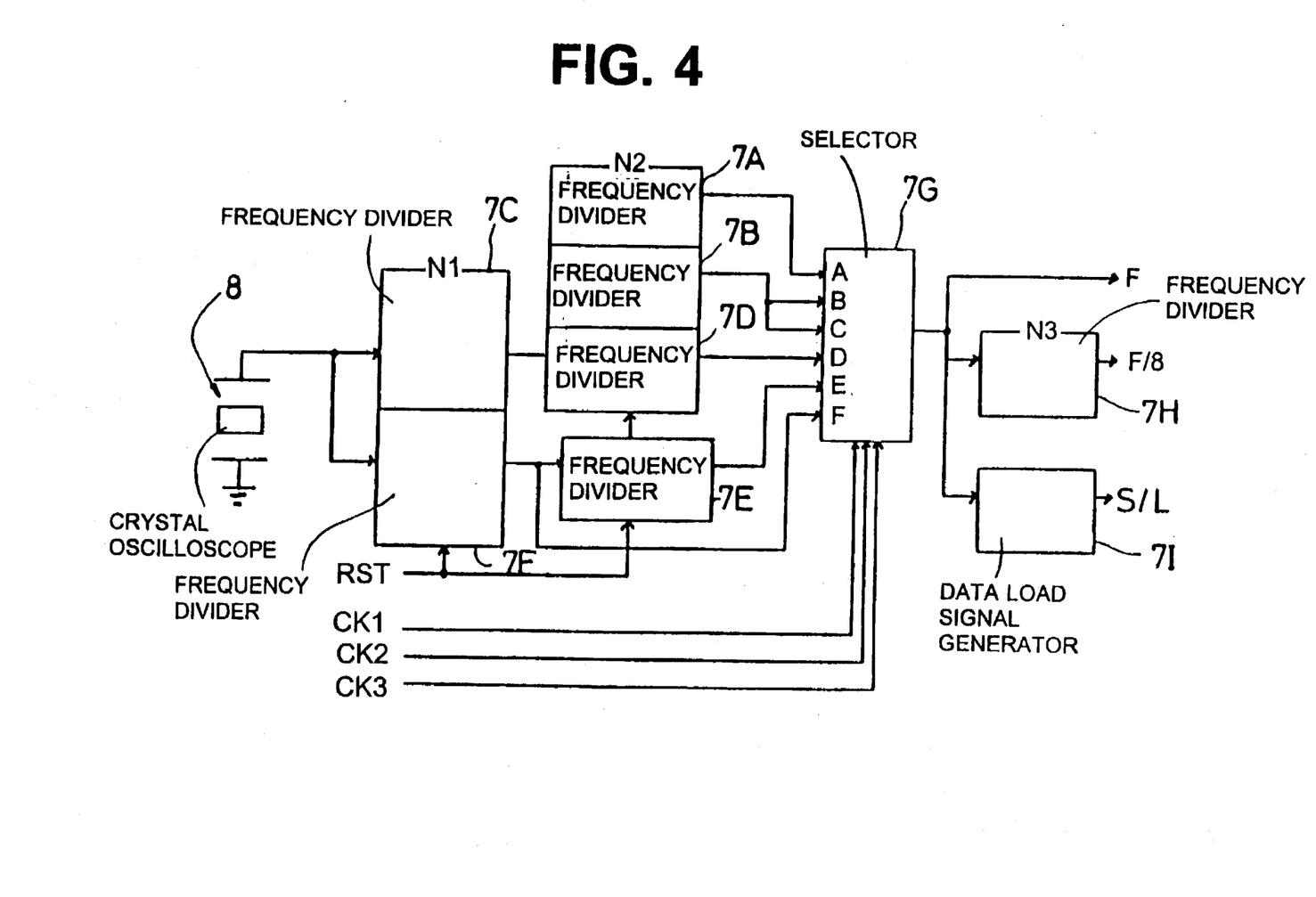
FIG. 4 illustrates the constitution of the clock generating section of FIG. 1.

FIG. 4 illustrates the constitution of the clock generating section 7 of FIG. 1.

The clock generating section 7 includes frequency dividers 7A–7F and 7H, a selector 7G and a data load signal generator 7I; the respective frequency dividers 7A–7F are reset by the resetting or setting signal RST outputted from the status register 6; the respective frequency dividers 7A–7F are put to an operating mode upon completing a writing mode of the FIFO memories 2 and 3 so as to make a crystal oscilloscope 8 of 12.288 MHz generate clocks, the clocks being 8 kinds; one signal from among signals frequency-divided based on respective frequency dividing ratios is selected by the selector 7G in accordance with clock control signals CK1, CK2 and CK3 outputted from the status register 6; the selected signal is outputted to the parallel/serial converting section 9, to the 8 frequency divider 7H and to the data load signal generator 7I in accordance with a transmission clock signal F; an 8 frequency-divided signal F/8 is outputted from the 8 frequency divider 7H to the switch 5 to make the FIFO memories 2 and 3 output reading clocks RD1 and RD2; and a data loading signal S/L as an output signal of the data load signal generator 7I becomes an input data loading signal for the parallel/serial converting section 9, the signal S/L having the same frequency as that of the 8 frequency-divided signal F/8.

Figure 5:
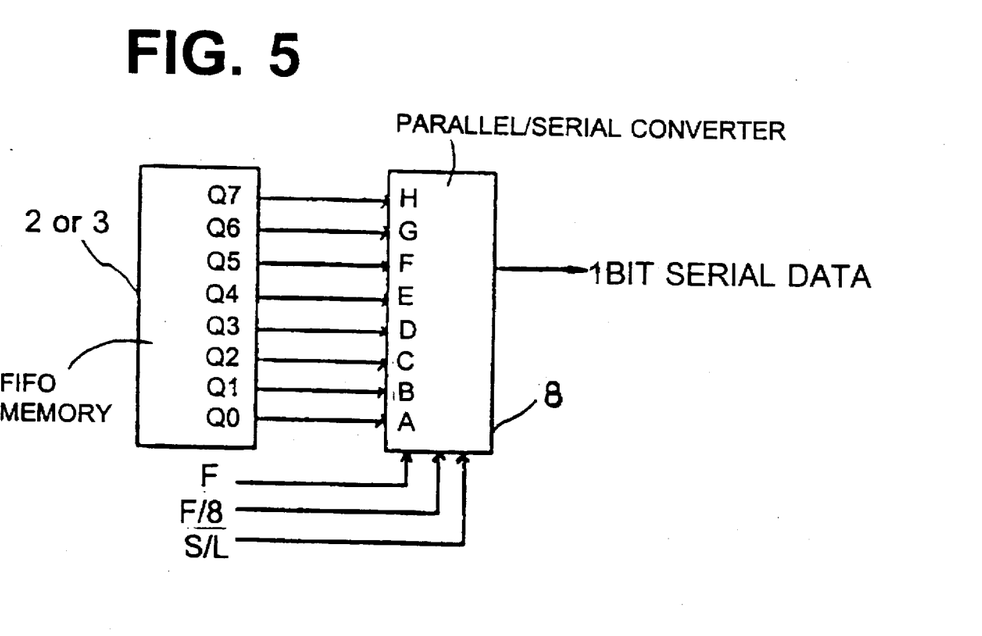
FIG. 5 illustrates the constitution of the parallel/serial converter of FIG. 1.
Figure 6:
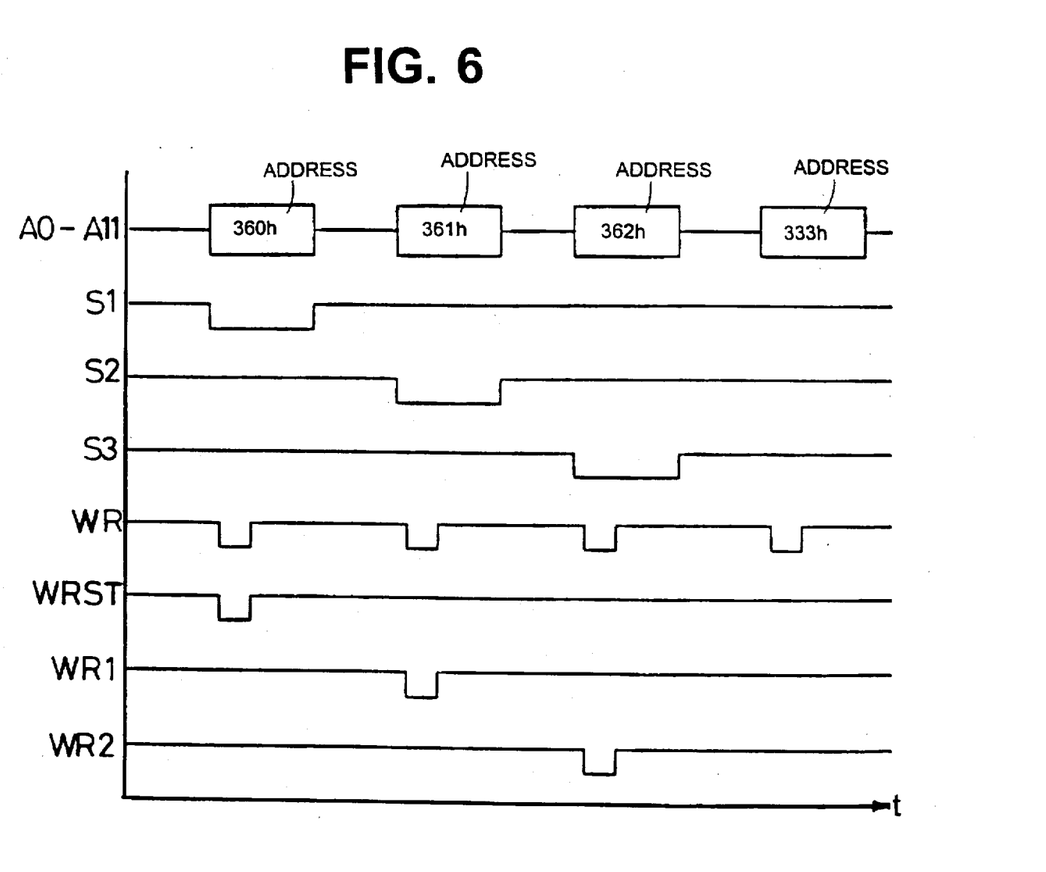
FIG. 6 illustrates wave patterns for the operation of the address decoder section of FIG. 2.

FIG. 5 illustrates the constitution of the parallel/serial converter 8 of FIG. 1.

In this parallel/serial converting section 8, the 8 frequency-divided signal F/8 is received from the clock generator 7 as an input clock; an output clock is the transmission clock signal F outputted from the clock generator 7; and 8-bit input data Q0–Q7 outputted from the FIFO memories 2 and 3 are latched by a data loading signal S/L of the clock generator 7 to be outputted as 1-bit serial data.

The circuit of the present invention will now be described as to its operations referring to FIGS. 6 to 9.

By utilizing an HDTV audio data compression algorithm, an audio bit stream is prepared through computer simulations, and this is stored into a hard disc 10. The PC 20 reads the data in patches of 16 K bytes to store them into the memory 20A of the PC 20. Then a software for controlling the audio bit stream generator outputs an address A and a data D to the input/output bus 20B. Then the 12-bit addresses A0–A11, the 8-bit data D0–D7 and the writing clock signal WR are outputted to the interface card section 30.

The address decoder 1 of the interface card section 30 decodes the 12-bit address A0–A11 which is loaded in the input/output bus 20B of the PC 20, thereby preparing writing clocks WR1 and WR2 of the FIFO memories 2 and 3 and a writing clock WRST of the status register 7. Under this condition, the addresses A0–A11 of the input/output bus 20B have a memory map as shown by the wave pattern of FIG. 6. That is, if the address is 360h, then the data of the input/output bus 20B is written in the status register 7. If it is 361h, then it is written in the FIFO memory 2, while if it is 362h, then it is written in the FIFO memory 3. That is, the address A0–A11 which is inputted into the address decoder section 1 compares the input/output addresses 360h, 361h and 362h in the respective detecting sections 1A, 1B and 1C. The compared values operate in such a manner that, when the input/output address 360h, 361h or 362h is inputted into the detecting section 1A, 1B or 1C, the detecting section 1A, 1B or 1C outputs a logic "0". Meanwhile, the detecting section 1A, 1B or 1C which has not received the input/output address 360h, 361h or 362h outputs a logic "1".

In accordance with the writing clocks WR1 and WR2, the 8-bit data D0–D7 which are loaded in the input/output bus 20B of the PC 20 are written in the FIFO memories 2 and 3. Under this condition, the FIFO memories 2 and 3 operate in the following manner. That is, if a writing operation is being carried out in the FIFO memory 2, the FIFO memory 3 carries out a reading operation. On the other hand, if a writing operation is being carried out in the FIFO memory 3, the FIFO memory 2 carries out a reading operation.

Such switching operations are carried out in the following manner. That is, the memory write/read control section 4 analyzes an empty flag EF which is generated after the completion of the reading operation of the FIFO memories 2 and 3. Then a control signal RDCNTL for it is sent to the switch 5 to switch the reading clocks RD1 and RD2 which are generated by the 8 frequency-divided signal F/8 of the clock generating section 7. Then it is supplied to the FIFO memory 2 or to the FIFO memory 3.

The writing clock WRST which is outputted from the address decoder 1 is supplied to the status register 6A of the status register section 6, and the logic of the status register 6A is as shown in Table 1.

When the address data 360h is outputted from the input/output bus 20B, a writing clock WRST is outputted through the detecting section 1A of the address decoder section 1. Under this condition, the status register 6A outputs control signal data CK1 and CK2 for controlling the audio bit stream generators. The 8-bit data D0–D7 which are inputted into the status register 6A is latched by the writing clock WRST, and the control of the operation for this is as shown in Table 1.

TABLE 1

Logic Table for Status Register

| Kind | b3-b0 | b7-b6 | Remarks |
| --- | --- | --- | --- |
| Audio bit stream transmission rate | 0100 | | 64 Kbps |
| | 1000 | XX | 128 Kbps |
| | 1010 | | 192 Kbps |
| Audio system mode | XXXX | 00 | Stereo |
| | | 01 | Joint stereo |
| | | 10 | Dual channel |
| | | 11 | 4 channel mode |

| Clck cntrl signls 1,2 | Clck cntrl signl 3 | Remarks |
| --- | --- | --- |
| 00 | 0 | 64 Kbps, 2 channels |
| | 1 | 64 Kbps, 4 channels |
| 01 | 0 | 128 Kbps, 2 channels |
| | 1 | 128 Kbps, 4 channels |
| 11 | 0 | 192 Kbps, 2 channels |
| | 1 | 192 Kbps, 4 channels |

| Signal | b5 | b4 | Remarks |
| --- | --- | --- | --- |
| RST signal | 1 | X | System clock generator reset |
| | 0 | X | Normal operation status |
| Reset signal | X | 1 | Normal operation status |
| | X | 0 | FIFO memories reset, initial status. |

That is, the two upper bits b7 and b6 among the 8 data bits correspond to the audio system mode, and their details are as shown in Table 1. They are outputted as a clock control signal CK3 by the logic OR section 6C of the status register section 6. The clock signal CK3 outputs a logic "0" under the stereo or two-channel mode, and outputs a logic "1" under a 4-channel mode. The bits b3–b0 of the status register 6A represent the transmission rate of the audio bit stream, and their output becomes clock control signals CK1, CK2, so that the signals CK1, CK2 and CK3 would control the frequency dividing ratio of the frequency dividers 7A–7F of the clock generating section 7. The bits b3–b0 are decoded by the exclusive OR section 6B of the status register section 6 to generate clock control signal CK1.

The bit b5 of the status register 6A outputs a reset signal RST to reset or set the clock generating section 7. That is, when the logic is "0", the clock generating section 7 is turned on, so that it can perform the normal operation.

If the final audio bit stream output is to be prevented at the initial stage, the logic of the reset signal RST becomes "1".

The bit b4 of the status register 6A outputs a reset signal RESET to reset or set the FIFO memories 2 and 3. That is, if the logic is "1", the FIFO memories 2 and 3 carry out the normal operations, while, if the logic is "0", the FIFO memories 2 and 3 are reset to be put to an initial status.

The clock generating section 7 receives the reset signals RST and the clock control signals CK1, CK2 and CK3 from the status register 6 to generate the audio transmission clock signals F and the reading clocks RD1 and RD2 for the FIFO memories 2 and 3. This clock generating section 7 has a logic table as shown in Table 2 below, and has the function of generating the necessary clocks under the control of the clock control signals CK1, CK2 and CK3 of the status register section 6 and in accordance with the crystal oscillator 8 of 12.288 MHz.

TABLE 2

Logic table of Clock Generating Section

| F (MHz) | N1 | N2 | N3 | F bit rate | (Kbps) | Remarks |
| --- | --- | --- | --- | --- | --- | --- |
| 12.288 MHz | 12 | 8 | 8 or | 128 | 64 Kbps | (2 channels) |
| | | 4 | 1 | 256 | 64 Kbps | (4 channels) |
| | 12 | 4 | 8 or | 256 | 128 Kbps | (2 channels) |
| | | 2 | 1 | 512 | 128 Kbps | (4 channels) |
| | 16 | 2 | 8 or | 384 | 196 Kbps | (2 channels) |
| | | 1 | 1 | 768 | 196 Kbps | (4 channels) |

First, at the initial mode, the respective frequency dividers 7A–7F of the clock generating section 7 are reset by the reset signals RST which are outputted from the status register 6. When the FIFO memories 2 and 3 complete writing operations, the frequency dividers 7A–7F are all put to an operating mode to generate clocks. Under this condition, there are 8 kinds of clocks, and only one is selected from among the signals which are frequency-divided by the clock control signals CK1, CK2 and CK3 of the status register section 6. The transmission clock signal F which is one of the output signals is inputted into the parallel/serial converting section 9, and internally, an 8 frequency-divided signal F/8 is outputted from the 8 frequency divider 7H to the switch 5, with the result that the reading clocks RD1 and RD2 for the FIFO memories 2 and 3 are outputted. The data load signal generating section 7I outputs a data loading signal S/L having the same frequency as that of the 8 frequency divided signal F/8, to the parallel/serial converting section 9.

Figure 7:
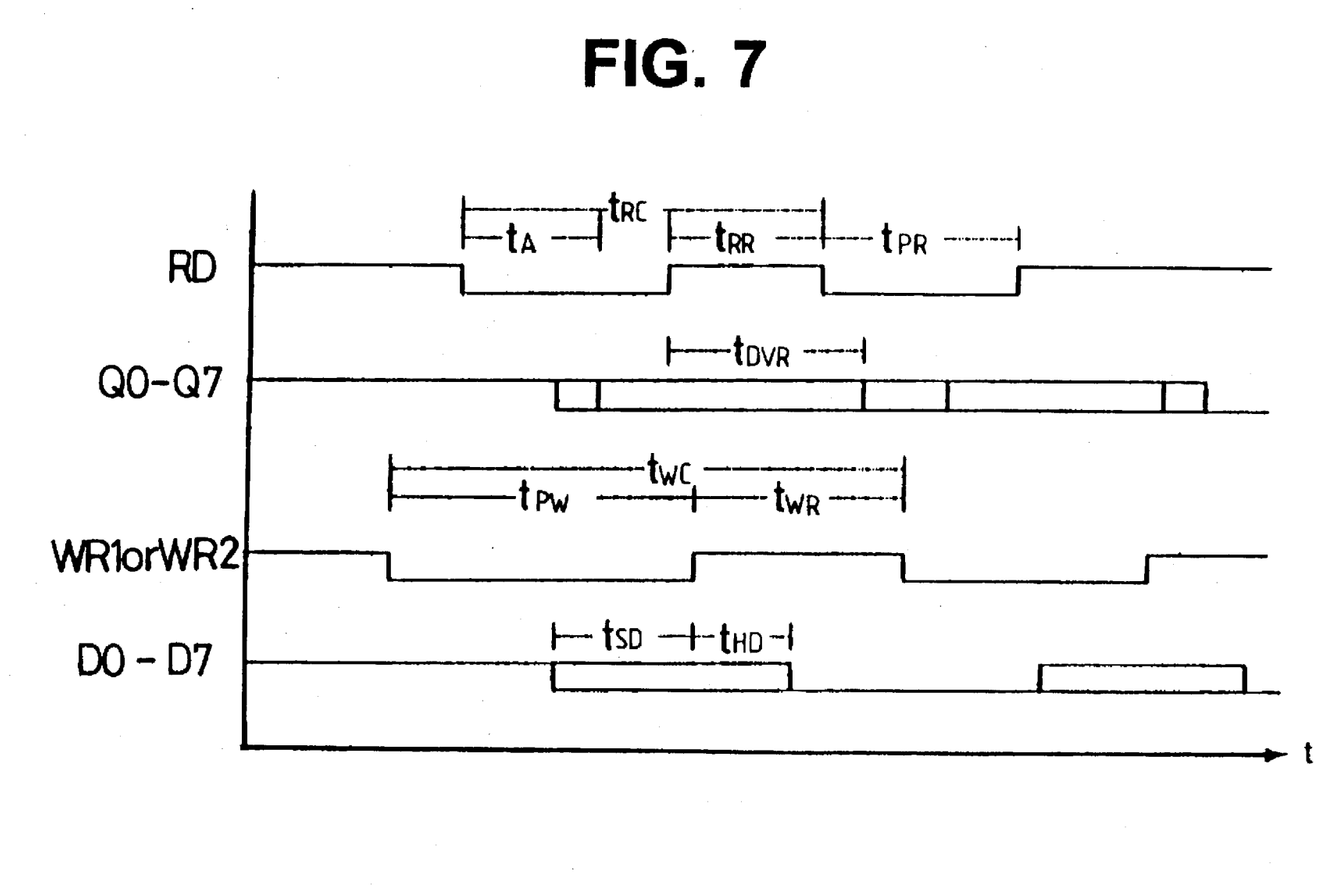
FIG. 7 illustrates wave patterns for the operation of the read/write clocks of the FIFO memories of FIG. 1.

FIG. 7 illustrates wave patterns for the operation of the read/write clocks of the FIFO memories 2 and 3 of FIG. 1.

The data buses of the FIFO memories 2 and 3 are loaded with data having the same wave pattern as that of D0–D7. Then the writing operations of the FIFO memories 2 and 3 are carried out by a writing clock having the same wave pattern as that of the WR1 and WR2. Under this condition, each time when the writing clock WR1 or WR2 is inputted, the address is incremented by 1 in the FIFO memories 2 and 3. The above operation is carried out at the rising edge of the writing clock WR1 or WR2. Further, the FIFO memories 2 and 3 first outputs the first inputted data in accordance with the reading clock having the same wave pattern as that of the reading clock RD.

In FIG. 7, tRC and tWC indicate a cycle time of the read/write operation respectively, tA indicates an access time, tRR and tWR indicate a recovery time of the read/write operation respectively, tPR and tpW indicate the pulse widths of read/write signals respectively, tDVR indicates a highest data valid time in the reading operation, tSD indicates a data setup time, and tHD indicates a data hold time.

Figure 8A:
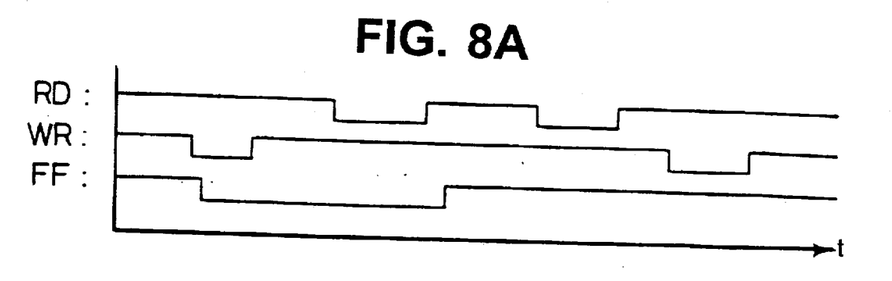
FIG. 8A illustrates wave patterns of the full flag signals of the FIFO memories after the completion of a writing operation.

FIG. 8A illustrates wave patterns of the full flag signals EF of the FIFO memories 2 and 3 after the completion of a writing operation. When a writing operation is completed as much as a capacity (16 k bytes) of the FIFO memories 2 and 3, there is given an information that the memory is filled to the full through an internal operation of the FIFO memories 2 and 3.

Figure 8B:
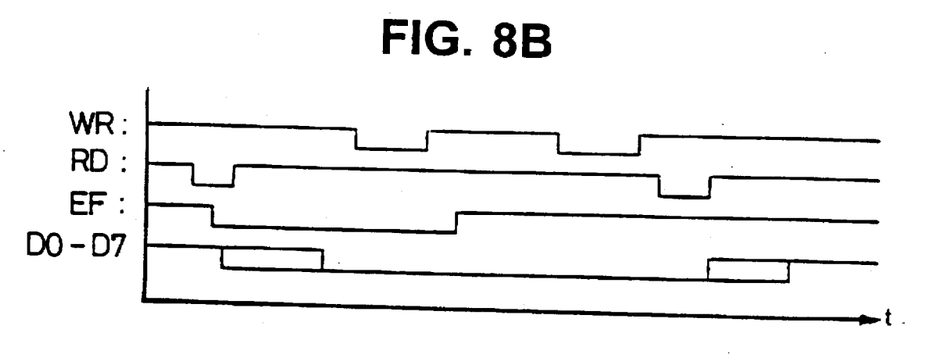
FIG. 8B illustrates wave patterns of the empty flag signals of the FIFO memories after the completion of a reading operation.

FIG. 8B illustrates wave patterns of the empty flag signals EF of the FIFO memories 2 and 3 after the completion of a reading operation. When a reading operation is completed by the FIFO memories 2 and 3, the empty flag signal EF logic becomes "0", after reading a last data by means of a signal informing that the FIFO memories 2 and 3 are vacant.

Figure 9:
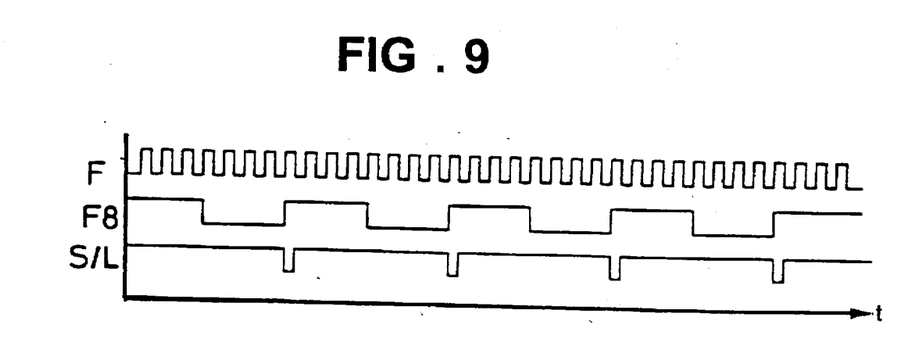
FIG. 9 illustrates wave patterns for the operation of the parallel/serial converting section of FIG. 5.

FIG. 9 illustrates wave patterns for the operation of the parallel/serial converting section 9 of FIG. 5. The parallel/ serial converting section 9 receives the 8 frequency-divided signal F/8 of the clock generator 7 as an input clock, and outputs the transmission clock signal F of the clock generator 7. The 8-bit output data Q0–Q7 which are outputted from the FIFO memories 2 and 3 are latched at a falling edge of the data loading signal S/L of the clock generator 7 so as to output 1-bit serial data.

The software which are for controlling the above described operations will be described referring to FIGS. 10 and 11.

Figure 10:
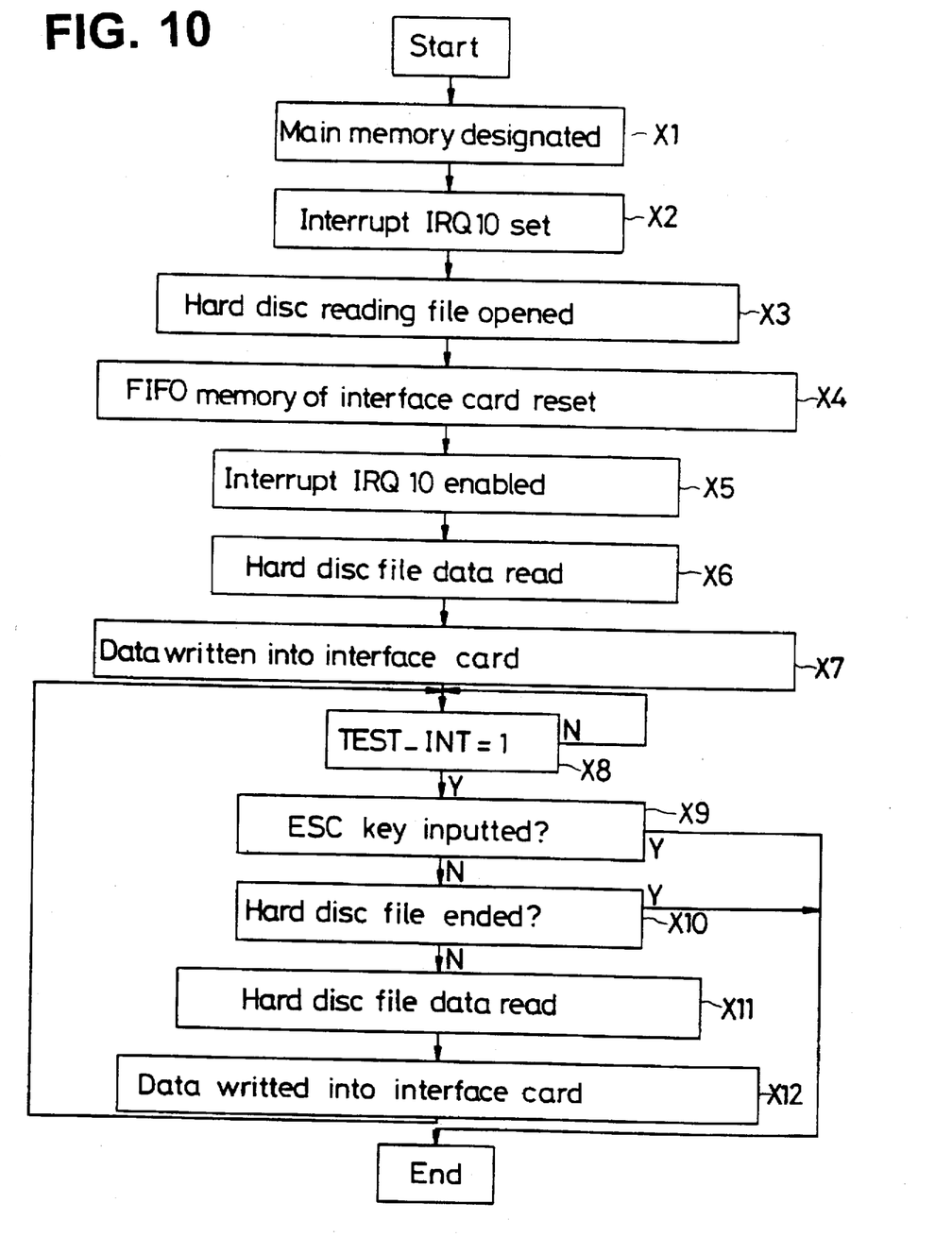
FIG. 10 is a main routine flow chart for the software for the audio bit stream generator according to the present invention.

FIG. 10 is a main routine flow chart for the software for the audio bit stream generator according to the present invention. If the program is activated, first the files of the hard disc 10 are read to set the main memory 20A for a temporarily storing, and then, a data is defined for resetting the interface card section 30 (step X1). Then if the interface card section 30 requests an interrupt, a value needed to the interrupt is set to an interrupt register (step X2), so that an interrupt routine can be carried out. Under this condition, the interrupt is IRQ10 which is not used for the peripheral hard disc in a PC. After step X2, a file is opened as a preparatory task for reading an encoded audio bit stream file which is stored in the hard disc and prepared through computer simulations (X3). Then, the FIFO memories 2 and 3 which are disposed in the interface card section 30 are reset, and then, clock control signals CK1, CK2 and CK3 are outputted, so that no clock would be outputted from the clock generating section 7 (step X4). If the interface card section 30 requests an interrupt, the IRQ10 is enabled, so that the program would leap to an interrupt routine (step X5). After step X5, the data are read from the hard disc 10 in patches of 16 K bytes to store them into the main memory 20A (step X6), and the stored data are written into the FIFO memories 2 and 3 of the interface card section 30 (X7). Then a checking is made as to whether an interrupt is generated, and whether the interrupt is being carried out (step X8). If an interrupt has not generated, the system waits until an interrupt is generated, and when an interrupt is generated, a checking is made as to whether an ESC key has been inputted through a keyboard (step X9). If an ESC key has been inputted, the program is terminated. Otherwise, a checking is made as to whether a file to be read exists in the hard disc 10 (step X10). If there is no data to be read, the program is terminated. Otherwise, a data is read from the hard disc 10 (step X11) to output it to the interface card section 30 (step X12). After completion of step X12, the system returns to step X8.

Figure 11:
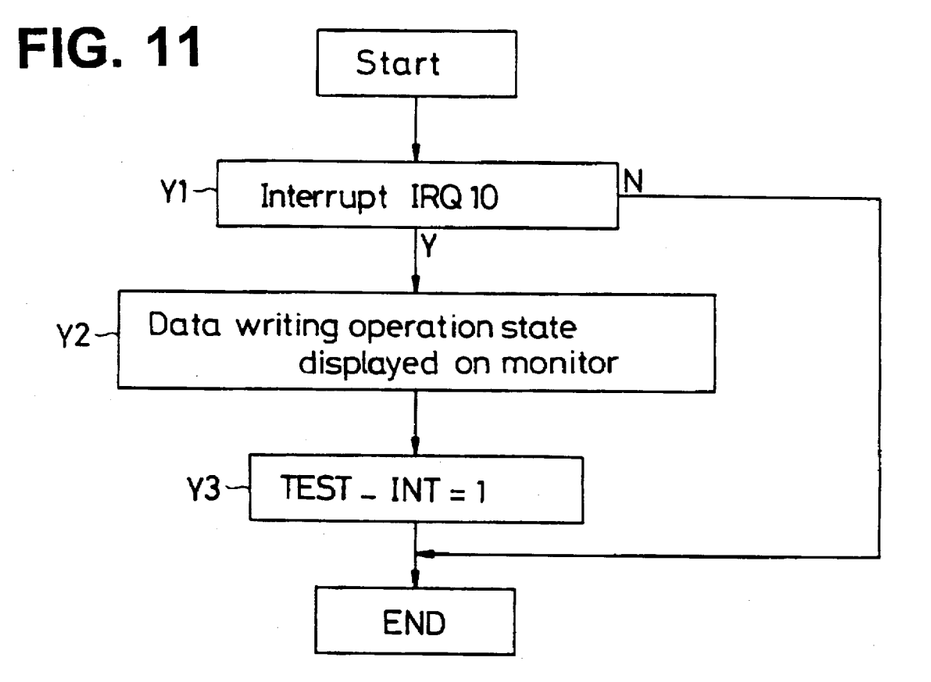
FIG. 11 is an interrupt routine flow chart for the software for controlling the audio bit stream generator according to the present invention.

FIG. 11 is an interrupt routine flow chart for the software for controlling the audio bit stream generator according to the present invention. If an interrupt is generated from the main routine, the software is activated. Then a checking is made again as to whether the generated interrupt is IRQ10 (step Y1). When the interrupt is confirmed, the one of the FIFO memories 2 and 3 of the interface card section 30, which is used presently, is displayed on a monitor (step Y2). Then, in order to notify that an interrupt is generated from the main routine, a test-int signal is set to "1"(step Y3). The program terminates after this last step (step Y3) or if the inquiry is "NO" after the interrupt check (step Y1).

According to the present invention as described above, the problems of economy and time for manufacturing or procuring the expensive audio encoder are solved, when developing an HDTV audio decoding system. In the actual use, the system can be provided in a simple form. Technically, a method for using and controlling a PC interrupt, a method for controlling a hard disc, a method for controlling an interface, and a method for forming a simple hardware using an FIFO memory have been developed. Therefore, even when the audio spectrum for an HDTV is changed, the method of the present invention can be easily applied. Further, the present invention can be applied to digital apparatuses using other data compressing methods.

What is claimed is:

1. An audio bit stream generator for an HDTV utilizing a PC, comprising:

a hard disc for storing an HDTV audio data encoded and prepared through computer stimulations;

an input/output bus;

a first-in first-out (FIFO) memory;

a status register for controlling said input/output bus;

a PC with main memory for reading a certain amount of the audio data to output it to the input/output bus;

an address decoder section for analyzing output addresses of the input/output bus, and for controlling the FIFO memory and the status register section;

a parallel serial converter;

said FIFO memory for storing 8-bit data from said input/output bus of said PC and for outputting modified 8-bit data to parallel/serial converter;

a memory read/write control section for controlling read/write operations of said FIFO memory;

a switch for controlling a reading operation of said FIFO memory under a control of said memory read/write control section;

said parallel/serial converter for converting the modified 8-bit data to 1-bit serial data; and a clock generating section for generating transmission clocks used to control said parallel/serial converter and thereby forming the audio bit stream from the 1-bit serial data.

2. The audio bit stream generator as claimed in claim 1, wherein said address decoding section comprises a first, a second, and a third address detecting section and a first, a second, and a third logic AND section; inputs said output addresses from said input/output bus into the first, second, and third address detecting sections in accordance with the output addresses; and subjects an output signal of each of the first, second, and third address detecting sections to an ANDing operation with writing clocks of said said input/output bus to respectively output a first clock signal to said status register section and a second and a third clock signal to said FIFO memory.

3. The audio bit stream generator as claimed in claim 1, wherein said memory read/write control section controls said FIFO memory in accordance with: full Flag signals outputted from said FIFO memory to indicate that said FIFO memory is full after a writing operation in the FIFO memory is completed; and empty signals outputted from said FIFO memory to indicate that there is a vacancy in said FIFO memory after a reading operation is completed by said FIFO memory.

4. The audio bit stream generator as claimed in claim 1, wherein said switch switches reading clocks of said FIFO memory generated in accordance with an 8 frequency-divided signal from said clock generating section and a read control signal from said memory read/write control section.

5. The audio bit stream generator as claimed in claim 1, wherein said status register section comprises a status register, an exclusive OR section and a logic OR section; and in this status register section two bits among the 8-bit data from said input/output bus are latched by a first clock signal are outputted by the logic OR section as a first clock control signal under an audio system mode, a third bit from the 8-bit data functions as a setting signal to control the clock generating section a fourth bit from the 8-bit data is used as a reset signal for resetting or setting said FIFO memory, remaining bits from the 8-bit data represent a transmission rate of the audio bit stream, from which the status register section outputs a second and a third clock control signal, therein the remaining bits are decoded by said exclusive OR section to output the second clock control signals, said second and third clock control signals controlling of said clock generating section together with the first clock control signal.

6. The audio bit stream generator as claimed in claim 1, wherein said clock generating section comprises a set of frequency dividers, a separate frequency divider, a selector and a data load signal generator; the set of frequency dividers reset by the setting signal outputted from the status register and put to an operating mode upon completing a writing mode by said FIFO memory so as to make a crystal oscilloscope generate clocks; one signal from among signals frequency-divided by the set of frequency dividers is selected by said selector in accordance with a first, a second, and a third clock control signal from said status register and outputted to said parallel/serial converting section, to said separate frequency divider, and to said data load signal generator in accordance with a transmission clock signal; an 8 frequency-divided signal is outputted from said separate frequency divider to said switch to make the FIFO memory output reading clocks and a data loading signal outputted by said data load signal generator becomes an input data loading signal for said parallel/serial converting section, the data loading signal having the same frequency as that of the 8 frequency-divided signal.

7. The audio bit stream generator as claimed in claim 1, wherein said parallel/serial converting section receives an 8 frequency-divided signal from said clock generator as an input clock and outputs an output clock based on a transmission clock from said clock generating section; and the modified 8-bit data from said FIFO memory is latched by a data load signal from said clock generating section when outputted to the parallel/serial convertor.

8. A method for controlling an audio bit stream generator by utilizing a PC, comprising the steps of:

setting a main memory for storing a file from a hard disc to temporarily store said file upon starting of a program, and defining a data for resetting an interface card section;

setting an IRQ10 required for an interrupt of an interrupt register and not used for said hard disc of said PC, to carry out an interrupt routine upon request of an interrupt by said interface card section;

opening a file as a preparatory task for reading an encoded audio bit stream file prepared through computer stimulations and stored in said hard disc ;

resetting a FIFO memory disposed in said interface card section, and outputting a clock so that clock generator 7 does not output a clock (X4);

enabling said IRQ10 to leap to an interrupt routine in said program upon a request from said interface card section;

reading encoded audio bit stream data from said hard disc in patches of 16 k bytes to store them into said main memory;

starting to write data of the preceding step into said FIFO memory of said interface card section;

checking as to whether an interrupt routine has been carried out after generation of an interrupt;

checking as to whether an ESC key has been inputted through a keyboard after a generation of an interrupt;

checking as to whether there exists a data to be read in the file of said hard disc, upon finding that an ESC key has not been inputted;

reading the data from said hard disc upon finding that a data to be read exists; and outputting data of the preceding step to said interface card section which generates the audio bit stream, the above steps being carried out in a cited order.

9. The method as claimed in claim 8, further comprising the steps of:

checking again as to whether said interrupt IRQ10 has been inputted for said interrupt routine (Y1); and setting a test-int signal to "1" to report that an interrupt has been generated in a main routine (Y3).

* * * * *